United States Patent [19]

Charlton

[11] 4,038,548

[45] July 26, 1977

[54] LEVEL AND INTERFACE DETECTION

[75] Inventor: John Stuart Charlton, Billingham, England

[73] Assignee: Imperial Chemical Industries Limited, London, England

[21] Appl. No.: 588,647

[22] Filed: June 19, 1975

[30] Foreign Application Priority Data

June 21, 1974 United Kingdom ............... 27644/74

[51] Int. Cl.² .......................... G01F 23/00; G01T 3/00
[52] U.S. Cl. ..................................... 250/357; 250/390; 250/391
[58] Field of Search ............... 250/356, 357, 390, 391, 250/392

[56] References Cited

U.S. PATENT DOCUMENTS

| 2,873,377 | 2/1959 | McKay | 250/391 |
| 3,389,250 | 6/1968 | Clemens | 250/357 |
| 3,668,392 | 6/1972 | Bajek et al. | 250/357 |
| 3,716,711 | 2/1973 | Olesen | 250/390 |
| 3,787,682 | 1/1974 | Bagge et al. | 250/390 |

Primary Examiner—Archie R. Borchelt
Attorney, Agent, or Firm—Cushman, Darby & Cushman

[57] ABSTRACT

Method and apparatus for determining the position of the interface between a liquid and its vapor or between two liquids by exposing the liquid(s) to fast neutrons and monitoring the resultant emergent slow neutrons from the vessel containing the liquid(s).

12 Claims, 4 Drawing Figures

LEVEL AND INTERFACE DETECTION

The present invention relates to an improved method and apparatus for detecting the level of liquid in a vessel. The improved method also enables the interface between two immiscible or partly-miscible liquids having differing abilities to moderate fast neutrons and/or to absorb slow neutrons to be detected. One form of the invention relates to an improved method for continuously monitoring the level of liquid in a vessel. This form of the invention also enables the interface between two immiscible or partly miscible liquids which differ in their abilities to moderate fast neutrons and/or to absorb slow neutrons to be continuously monitored.

It has been proposed to detect the level of liquid in a vessel using a fixed and collimated radioactive source, for example an γ-ray source, and a fixed detector for the radiation. When the level of liquid interrupts the path between source and detector, the detector records a change in the transmission of the radiation. This method has the disadvantage that the exact level of the liquid cannot be monitored unless it is on or adjacent to the path between source and detector. To monitor the level over a range of heights in the vessel, it has been proposed to use a single γ-ray source having a divergent radiation beam and an elongated radiation detector covering a range of heights in the vessel. As the liquid level rises, more and more of the elongated detector is obscured and the radiation from the source is increasingly absorbed. The detector thus records a signal which is a function of the position of the level.

In vessels containing immiscible liquids or partly-miscible liquids it is useful to be able to monitor the level of the interface between the liquids as well as the level of the upper liquid. We have found that the interface cannot usually be detected using γ-radiation because the radiation path length through the vessel is usually sufficient to cause complete absorption of the radiation beam by either liquid. However, we have surprisingly found that if the immiscible or partly-miscible liquids differ in their abilities either to moderate fast neutrons and/or to absorb slow neutrons, it is possible to monitor the position of the interface as well as the level of the upper liquid using a device incorporating a source of fast neutrons and a detector of slow neutrons.

According to the present invention a method for determining the position of the interface between a liquid and its vapour or between two liquids in a vessel, the liquids differing in their abilities to moderate fast neutrons and/or to absorb slow neutrons, comprises exposing the liquid or liquids to fast neutrons emitted from a source adjacent to the vessel and monitoring the slow neutrons emerging from the liquid or liquids. By the term "fast neutrons" we mean energetic neutrons of energies greater than about 0.5 MeV. By the term "slow neutrons" we mean neutrons of energies less than 10 ev. Moderation is the process by which fast neutrons lose energy to become slow neutrons.

The liquids should differ in their abilities to moderate fast neutrons and/or absorb slow neutrons by at least 5%, i.e. there should be a difference of at least 5% in the number of emergent slow neutrons from each liquid when the liquids are exposed to identical sources. Conveniently, the slow neutrons emerging from the liquid or liquids are monitored at at least two positions on the vessel.

A further form of the invention is equipment for determining the position of the interface between a liquid and its vapour or between two liquids in a vessel, the liquids having differing abilities to moderate fast neutrons and/or to absorb slow neutrons which comprises an emitter of fast neutrons, which in use is positioned adjacent the vessel and an associated detector of slow neutrons, which in use is placed adjacent the vessel to receive at least some of the slow neutrons emerging from the vessel.

The fast neutron source may be fixed or movable. The slow neutron detector is conveniently elongated. An alternative and equivalent arrangement is series of slow neutron detectors placed end to end along a side of the vessel and/or a series of discrete neutron sources arranged at intervals along a side of the vessel.

For the detection of a level or interface the fast neutron source and slow neutron detector are conveniently contained in a portable probe unit. In operation, this is moved backward and forward over the outer surface of the vessel and the slow neutrons detected per unit time are recorded on a portable electronic unit. When the source and detector are moved through the position of the liquid/liquid interface or through the position of the top liquid level there are measurable changes in the rate of detection of slow neutrons from which the position of the interface and the top level can be identified.

A suitable source of fast neutrons is $^{241}$Am-Be and a suitable detector is a $^3$He proportional counter.

The method and apparatus of the invention readily allow the level of the interface and the level of the upper liquid in a vessel to be determined within ± 0.5 inches.

The method and apparatus of the invention may also be used to give warning when the interface between two liquids, or a liquid level, approaches any desired position in a vessel. The fast neutron source may be fixed adjacent to the desired position on the vessel wall. The slow neutron detector, which for this purpose may be of small vertical dimensions is positioned on the vessel wall on the same horizontal plane as the source. The slow neutron detector may occasionally be positioned on the opposite side of the vessel but we have found it more convenient to position the source and detector side by side. As the interface or liquid level approaches the position of the source and detector there is a change in the rate of detection of the slow neutrons which signals the approach of the interface or level and this can be used to operate an appropriate alarm.

In yet a further application of the method the fast neutron source and slow neutron detector are contained in a probe unit which is moved automatically up and down the vessel either inside an inserted dip-pipe or on the outer wall of the vessel and the detected slow neutron count-rate is recorded. The position of the interface, indicated by a change in the slow neutron count-rate is thus detected once in every transit which the probe makes of the vessel height. The transit time of the probe unit can be adjusted so that an indication of the interface position is provided with suitable frequency.

The invention will be further understood from the following more detailed description taken with the drawings in which.

EXAMPLE

Figure 1:
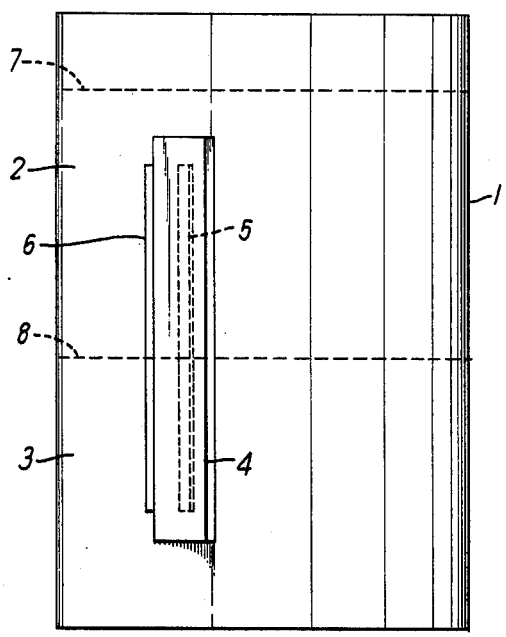
FIG. 1 is an elevational view of a vessel fitted with apparatus embodying the principles of the invention.
Figure 2:
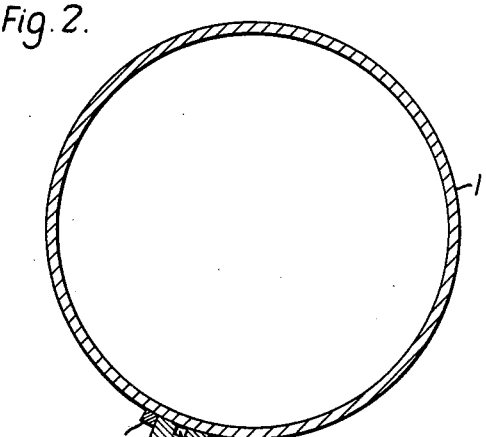
FIG. 2 is horizontal sectional view of the vessel of FIG. 1.

Referring to the drawings, a vessel 1 houses two immiscible liquids, the upper liquid 2 being benzene and the lower liquid 3 being water. The level of benzene within the vessel is indicated by the dotted line 7 and the interface between the liquids is indicated by the dotted line 8. A suitable protective housing 4 surrounds an elongated source 5 (indicated by dotted lines in FIG. 1) of fast neutrons and the source and housing are clamped, externally, to the side of vessel 1 together with an elongated detector 6 of slow neutrons. In operation, fast neutrons from the source 5 enter the vessel 1 and interact with the material contained therein. The fast neutrons are moderated by interaction with the material in the vessel which is adjacent the source. A fraction of the resulting slow neutrons diffuse back out from the vessel and are detected by detector 6. The concentration of slow neutrons at the detector is thus a function of the ability of the material adjacent to the source to moderate fast neutrons and to absorb slow neutrons.

The rate of detection of slow neutrons is affected by the position of the interface between the benzene and water relative to the detector length. Thus the count-rate recorded by the detector provides a continuous indication of the interface position.

It was found that, for the benzene/water mixture contained in vessel 1, the detected count-rate with the interface adjacent the top of the detector 6 (and thus with water adjacent substantially the whole detector length) was about twice that obtained when the interface was adjacent the bottom of the detector 6 (and thus with benzene adjacent the whole detector length).

Figure 3:
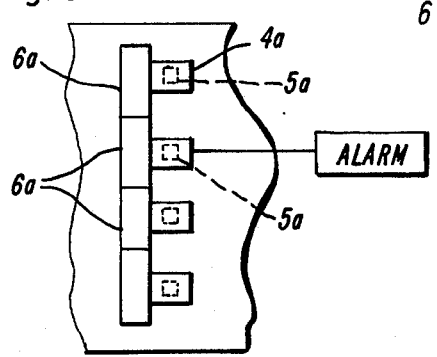
FIG. 3 is a fragmentary view of a second embodiment of the invention in which there are a plurality of detectors and neutron sources.

In FIG. 3 there is shown an arrangement in which are a series of slow neutron detectors 6a placed end-to-end along a side of a vessel. A fast neutron source 5a and housing 4a therefor is associated with each detector 6a. An alarm is connected with one source-detector set in order to indicate the approach of the liquid - liquid interface to that set.

Figure 4:
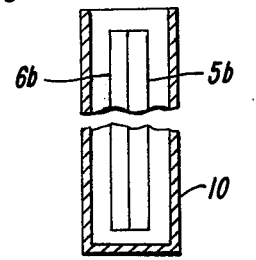
FIG. 4 is a fragmentary view of a third embodiment in which a detector and a neutron source are contained in a probe.

FIG. 4 illustrates an embodiment in which an elongated fast neutron source 5b and an associated elongated slow neutron detector 6b are contained in tubular probe 10.

I claim:

1. Equipment for determining the position of the interface between two liquids in a vessel, both liquids having a moderating effect on fast neutrons and being selected from the group consisting of liquids having differing abilities to moderate fast neutrons, liquids having differing abilities to absorb slow neutrons and liquids having different abilities to moderate fast neutrons and to absorb slow neutrons comprising an emitter of fast neutrons, which in use is positioned adjacent the vessel and an associated detector of slow neutrons, which in use is placed adjacent the vessel to receive at least some of the slow neutrons emerging from the vessel.

2. Equipment as claimed in claim 1 in which the fast neutron source is movable.

3. Equipment as claimed in claim 1 in which the slow neutron detector is elongated.

4. Equipment as claimed in claim 1 in which the slow neutron detector comprises a series of slow neutron detectors, which in use are placed end to end along a side of the vessel.

5. Equipment as claimed in claim 1 in which the neutron source comprises a series of discrete neutron sources, which in use are arranged at intervals along a side of the vessel.

6. Equipment as claimed in claim 1 in which the fast neutron source and slow neutron detector are contained in a probe.

7. A method for determining the position of the interface between two liquids in a vessel, the liquids having a moderating effect on fast neutrons and being selected from the group consisting of liquids differing in their abilities to moderate fast neutrons liquids differing in their abilities to absorb slow neutrons, and liquids differing in their abilities to moderate fast neutrons and to absorb slow neutrons, which comprises exposing the liquids to fast neutrons emitted from a source adjacent to the vessel and monitoring the slow neutrons emerging from the liquids.

8. A method as claimed in claim 7 in which a fast neutron source and an associated slow neutron detector are positioned adjacent a pre-determined position on the wall of a vessel and operate an associated alarm upon the approach of the interface between the two liquids to the pre-determined position.

9. A method as claimed in claim 7 in which the neutron source and neutron detector are positioned side by side.

10. A method as claimed in claim 7 in which the neutron source and slow neutron detector are contained in a probe unit which is moved up and down relative to the interface.

11. Equipment for determining the position of the interface between two liquids in a vessel, the liquids having a moderating effect on fast neutrons and having differing abilities to interact with neutrons, said apparatus comprising a fast neutron source positioned to expose at least a portion of both liquids at the interface to a stream of neutrons, and a neutron detector for detecting the rate of neutrons, said detector being positioned to receive at least some of the neutrons acted on by both liquids whereby the detected rate of neutrons is indicative of the relative positions of the detector and the interface between the two liquids.

12. A method for determining the position of an interface between two liquids in a vessel, the liquids having a moderating effect on fast neutrons and having differing abilities to interact with neutrons, said method comprising exposing at least a portion of both liquids at the interface to a stream of fast neutrons and detecting the rate of at least some of the neutrons which have been acted on by both liquids whereby the detected rate of neutrons is indicative of the position of the interface.

* * * * *